United States Patent [19]
Sakamoto

[11] Patent Number: 5,308,171
[45] Date of Patent: May 3, 1994

[54] AXLE BEARING UNIT WITH ROTATIONAL SPEED SENSOR

[75] Inventor: Junshi Sakamoto, Yokohama, Japan

[73] Assignee: NSK Ltd., Tokyo, Japan

[21] Appl. No.: 79,059

[22] Filed: Jun. 21, 1993

[30] Foreign Application Priority Data

Jun. 22, 1992 [JP] Japan .................. 4-48997[U]

[51] Int. Cl.$^5$ .................. F16C 32/00; G01P 3/48
[52] U.S. Cl. .................. 384/448; 324/207.25
[58] Field of Search .............. 384/448; 310/168, 155; 324/207.25

[56] References Cited

U.S. PATENT DOCUMENTS

| | | | |
|---|---|---|---|
| 4,259,637 | 3/1981 | Bloomfield et al. | 324/207.25 X |
| 4,778,286 | 10/1988 | Kadokawa | 384/446 |
| 4,864,231 | 9/1989 | Okumura et al. | 324/173 |
| 4,940,936 | 7/1990 | Grillo et al. | 324/174 |
| 4,960,333 | 10/1990 | Faye et al. | 384/448 |
| 5,018,384 | 5/1991 | Hayashi et al. | 73/118.1 |
| 5,081,416 | 1/1992 | LaCroix | 384/448 X |
| 5,209,580 | 5/1993 | Nakayama | 384/448 |

FOREIGN PATENT DOCUMENTS

| | | |
|---|---|---|
| 2653191 | 4/1991 | France . |
| 62-170363 | 10/1987 | Japan . |
| 1-288619 | 11/1989 | Japan . |
| 2-60802 | 3/1990 | Japan . |
| 2-83102 | 6/1990 | Japan . |
| 3-30864 | 3/1991 | Japan . |

*Primary Examiner*—Thomas R. Hannon
*Attorney, Agent, or Firm*—Evenson, McKeown, Edwards & Lenahan

[57] ABSTRACT

An axle bearing unit comprises an outer ring 23 secured to the end of an axle tube 1, an inner ring 26 supported in a freely rotational manner inside the outer ring 23 with a plurality of balls 9 therebetween, a pulser ring 17 secured to the outer peripheral surface of the inner ring 26, a sensor 19 inserted in a mounting hole 18 of the outer ring 23 with its tip faced to the outer peripheral surface of the pulser ring 17, a pair of first sealing members 29a, 29b provided radially between the outer peripheral surface of the two ends of the inner ring 26 and the inner peripheral surface of the outer ring 23.

4 Claims, 5 Drawing Sheets

AXLE BEARING UNIT WITH ROTATIONAL SPEED SENSOR

BACKGROUND OF THE INVENTION

1. Field of the Invention

The present invention relates to an axle bearing unit with a rotational speed sensor for an automobile used to maintain an axle for an automobile wheel of a commercial vehicle or a small truck or the like in a freely rotatable manner, and to sense the rotational speed of the axle.

2. Description of the Prior Art

A rear axle of a normal front-engines, rear-wheel-drive vehicle (often referred to as FR vehicle) is provided to extend through an axle housing or axle tube which is maintained via a spring on the underfloor surface of the chassis, and both ends of the rear axle are maintained in a freely rotatable manner by means of single-row rolling bearings such as ball bearings, tapered roller bearings, cylindrical roller bearings, or the like. The bearing for supporting one end of the rear axle is placed on the side closer to the differential gear, and the bearing for supporting the other end of the rear axle is on the side closer to the wheel.

The support structure shown in FIG. 7, for example, is disclosed in FIG. 4 of Japanese Patent First Publication No. H1-288619 as a conventional structure in which a rear axle 5 on an FR vehicle is supported in a freely rotatable manner with respect to an axle housing or tube by bearing 3. It will be noted that the bearing 3 is arranged together with a bearing housing 2 and a sealing member 29 etc. in one assembly. An axle housing or tube 1 is supported on the underfloor surface of an automobile through a leaf spring or the like and connected at one and to a casing of a differential gear (not shown), while the other end of the axle tube is provided with an open end section 1a on the side closer to the wheel (not shown) to allow connection to the bearing assembly as mentioned above.

In the bearing assembly provided on the wheel side, the cylindrical bearing housing 2 is secured by welding to the open end section 1a of the axle housing or tube 1. An outer ring 4 which forms part of the ball bearing 3 is fitted into the cylindrical bearing housing 2. The axle 5 is inserted through the above-mentioned axle tube 1 and has one end connected to the above-mentioned differential gear. An inner ring 6, which also forms part of the ball bearing 3, is fitted around at the other end, closer to the wheel, of the axle 5. A plurality of balls 9 is mounted between an outer ring raceway 7 on the inner peripheral surface of the outer ring 4 and an inner ring raceway 8 on the outer peripheral surf ace of the inner ring 6, so that the axle 5 rotates freely on the inside of the axle housing or tube 1.

One and of the outer ring 4 (the left end in FIG. 7) is abutted against a stepped section 10 formed on the inner peripheral surface of the bearing housing 2, and the other end of the outer ring 4 (the right end in FIG. 7) is abutted against a retaining cover 12 via a backing plate 11 (a member which acts as a baseplate for a drum brake).

The retaining cover 12 and the bearing housing 2 are connected by means of a bolt 13 and a nut 14 to prevent the outer ring 4 from falling out of the bearing housing 2. One end of the inner ring 6 (the right end in FIG. 7) is abutted against a stepped section 15 formed on the outer peripheral surface of the end, closer to the wheel, of the axle 5, and the other end of the inner ring 6 (the left end in FIG. 7) is abutted against the end of a securing ring 16, which is fitted around the axle 5, thus positioning the inner ring 6.

Japanese Patent First Patent Publication No. H1-288619 discloses, in FIG. 3, an integral structure of a single-row ball bearing with a mounting flange to improve the prior art structure as in FIG. 7.

Disclosed in Japanese Patent First Publication No. H2-60802 and Japanese Utility Model First Publication No. H2-83102 are a similar structure in that the outer ring is integrally formed with a mounting flange in a single-row ball bearing structure.

It should be noted, however, that no speed sensor is taken into consideration and combined with the bearing in these publications.

Accordingly, the bearing assembly on the wheel side as mentioned above with reference to FIG. 7 is conventionally modified as shown in FIG. 8 in the case where the rotational speed of the axle 5 is detected to control an antilock brake system (ABS) and a traction control system (TCS).

In FIG. 8, a pulser ring 17 which has its outer peripheral surface formed in a gear teeth shape is formed around the axle 5 and interposed axially between the inner ring 6 and the securing ring 16 to rotate with the axle 5. Also, at one end of the bearing housing 2, an installation hole 18 is formed at a position facing the outer peripheral surface of the pulser ring 17.

A sensor 19 with a support arm 20 is inserted into the installation hole 18 from the outside of the bearing housing 2. The tip of the sensor 19 faces the outer peripheral surface of the pulser ring 17. In addition, the support arm 20 of the sensor 19 is secured to the outer peripheral surface of the bearing housing 2 by a stud 21 screwed into a nut 22.

When the pulser ring 17 secured to the axle 5 rotates during the operation of the vehicle, the distance between the outer peripheral surface of the pulser ring 17 and the tip of the sensor 19 changes so that the output e.g. the amount of magnetic flux of the sensor 19 changes. Because the frequency of this change is proportional to the rotational speed of the axle 5, the ASS and the TCS can be controlled by enputting an output signal from the sensor 19 to a controller (omitted from the drawings).

The conventional assembly shown in FIG. 8 has a large number of structural parts, therefore the management of the parts and the assembly operation are complicated, resulting in high manufacturing costs. In addition, because the weight, in particular, the weight supported by the springs, is increased, the ability of the wheels to follow irregularities in the road surface is worsened, which is believed to cause the comfort sensation of the ride to worsen. Further, even an increase in weight, although small, causes an increase in fuel costs.

On the other hand, for example, structures for unitizing an axle bearing for supporting a wheel axle, a sensor and a pulser ring for sensing rotational speed are disclosed in Japanese Utility Model First Publication Nos. S62-170363 and H3-30864; U.S. Pat. Publication Nos. 4,778,286, 4,864,231, 4,960,333, and 5,018,384; French Patent Publication No. 2653191; and the like.

In these prior art documents, the outer ring of the bearing is integrally formed with a sensor, but the outer ring of the bearing unit is connected to a knuckle-type support member extending from a chassis of an automobile to support the axle. This type of bearing unit has a double-row bell bearing because the axle to support the wheel is supported by the bearing unit only.

It should be noted that the support functions disclosed in FIG. 7, FIG. 8, No. H2-60802 and No. H2-83104 using a single-row ball bearing are quite different from those disclosed in the publications above using a double-row ball bearing. Specifically, in the former cases, the axle is supported at the opposite ends specifically at one end on the automobile wheel side by a single-row ball bearing with its outer ring connected to the axle tube or housing, and at the other end on the side of the differential gear box by another single-row ball bearing, while in the latter cases, the axle is supported only at one location by a double-row ball bearing.

In addition, the support type to which the bearing is applied is quits different between the bearing units in FIG. 7, FIG. 8, No. H2-60802 and No. H2-83104 using a single-row ball bearing and those in the publications above using a double-row ball bearing. Specifically, in the former cases, the bearing is mounted azid supported by the axle housing or tube containing oil therein, so that connecting means such as a mounting flange and sealing means for oil are required, while in the latter cases the bearing is mounted and supported by the knuckle-arm member, so that flange means connected to the axle housing or tube, and sealing means for oil in the axle housing or tube are not required.

Therefore, the bearing unit as mentioned in the publications using the double-row ball bearing could not be applied to a suspension system using the single-row bearing.

A structure for unitizing an axle-bearing, a sensor and a pulser ring for sensing rotational speed in a single-row roller bearing unit is disclosed in U.S. Pat. No. 4,940,936. In this U.S. patent, a single-row roller bearing is connected to an axle housing or tube, and has an outer ring through which a hole is provided to insert a sensor.

However, since the outer ring is presa-fitted into the axle tube the secured connection of the axle bearing unit with an axle tube is not sufficiently obtained while the axle bearing unit could not be easily disconnected from the axle tube for maintenance.

In addition, there is no seal means between the bearing and the axle tube, and between the axle tube and the outer ring, so that oil in the axle tube can be easily penetrate into the bearing and leak out of the arrangement.

Although the bearing unit of this U.S. patent has sensor inserted into a hole in the outer ring, it is still insufficient in reliability and maintenance operation.

SUMMARY OF THE INVENTION

An object of the present invention is to provide, with due consideration to the drawbacks of such conventional devices, an axle bearing unit with a rotational speed sensor for providing improved efficiency in the management of parts and the assembly operation by reducing the number of parts, and for providing a reduction in manufacturing costs together with an improvement in the comfort of the ride and a reduction in fuel costs by reducing the weight.

The object of the present invention is achieved by the provision of an axle bearing unit having an outer ring formed with a mounting flange for connection with the axle housing or tube and an installation hole to insert a rotational speed sensor therein.

BRIEF DESCRIPTION OF ACCOMPANYING DRAWINGS

DETAILED DESCRIPTION OF THE PREFERRED EMBODIMENTS

An axle bearing unit in one embodiment of the present invention basically comprises: an outer ring; a mounting flange which is secured to the outer peripheral surface of the outer ring so as to be connected by abutting to a receiving-side flange secured to the open end of an axle housing or tube supported on the undersurface of the chassis; an outer ring raceway formed on the inner peripheral surface of the outer ring; an inner ring supported concentrically with the outer ring on the inner side thereof; an Inner ring raceway formed facing the outer ring raceway on the outer peripheral surface of the inner ring; a plurality of rolling members provided in a freely rolling manner between the inner ring raceway and the outer ring raceway; a pulser ring secured at a position axially separated from the inner ring raceway on the outer peripheral surface of the inner ring; an installation hole formed through the outer ring at a position facing the outer peripheral surface of the pulser ring; a sensor secured to the outer ring by being inserted into the installation hole from the outside of the outer ring with the tip of the sensor facing the outer peripheral surface of the pulser ring; first and second sealing means provided radially between the outer peripheral surface of the inner ring and the inner peripheral surface of the outer ring, on axially both sides of the arrangement of the sensor and the rolling members; and a third sealing means interposed in the section where the outer ring and the axle tube are joined.

When the axle of an automobile is supported in a freely rotational manner by the axle bearing unit with a rotational speed sensor as mentioned above, the mounting flange is connected by abutting a receiving-side flange of the axle tube, so that the outer ring is secured to the end of the axle tube, and the end of the axle is fitted inside the inner ring.

When the inner ring rotates together with the axle, the pulser ring which is secured to the outer peripheral surface of the inner ring also rotates, so that the output e.g. amount of magnetic flux of the sensor secured to the outer ring is altered at a frequency proportional to the rotational speed of the axle.

Embodiments of the present invention will now be explained with reference to the drawings.

Figure 1:
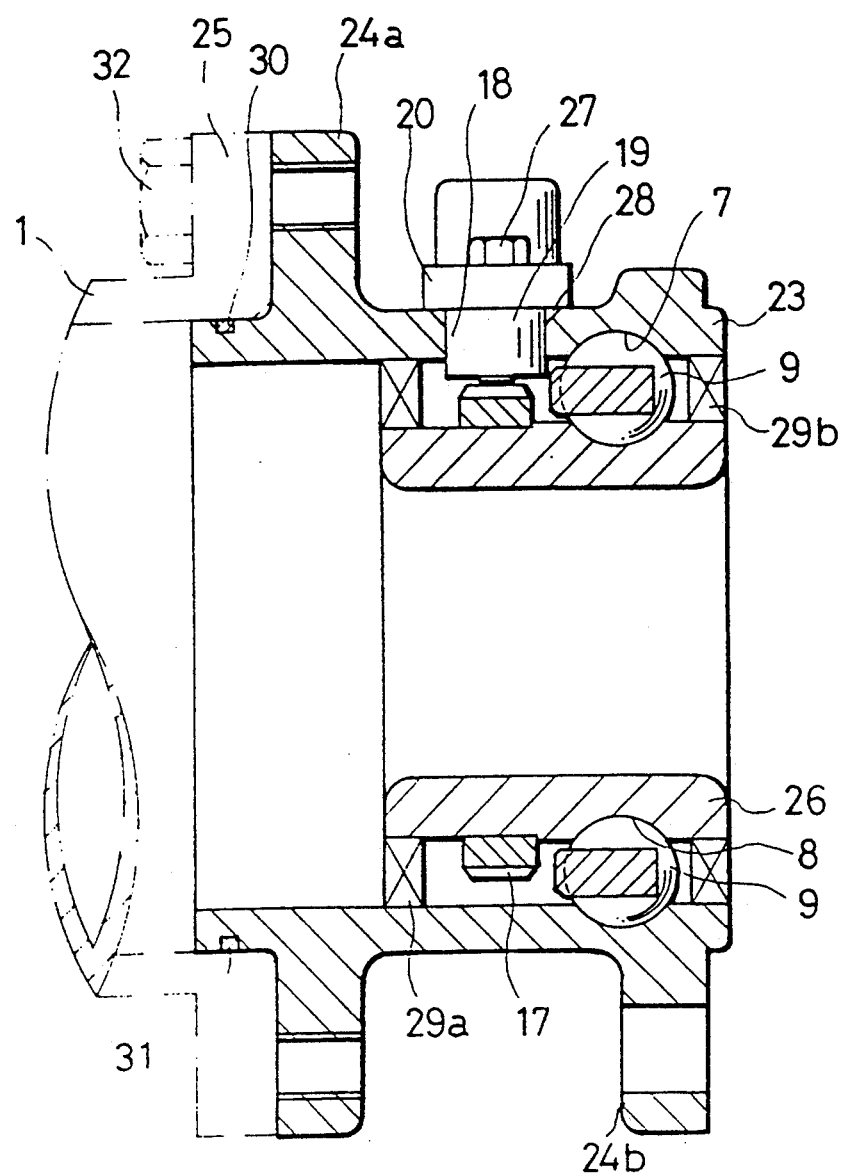
FIG. 1 is a cross sectional view to illustrate a first embodiment of the axle bearing unit according to the present invention.

FIG. 1 illustrates an embodiment of the present invention. A mounting flange 24a is integrally formed on the outer peripheral surface of an outer ring 23. The mounting flange 24a is adapted to be abutted and connected to a receiving-side flange 25 integrally secured to the open end of an axle tube 1 supported on the undersurface of the chassis (not shown). Another mounting flange 24b isointegrally formed on the outer peripheral surface of the outer ring 23, closer to the wheel (not shown).

An outer ring raceway 7 is formed on the inner peripheral surface of the outer ring 23, and an inner ring raceway 8 is formed on the outer peripheral surface of an inner ring 26 supported concentrically with the outer ring 23 on the inside of the outer ring 23. The outer and inner raceways 7 and 8 are mutually opposed, and a plurality of balls 9 is provided in a freely rolling manner between the outer and inner raceways 7 and 8.

In addition, a pulser ring 17 is securedly fitted around the outer peripheral surface of the inner ring 26 at a position axially separated from the inner ring raceway 8. The outer ring 23 is formed with an installation hole 18 which is provided at a position facing the outer peripheral surface of the pulser ring 17. A sensor 19 is inserted into the mounting hole 18 from the outside of the outer ring 23. A support arm 20, which is secured to the outer peripheral surface of the sensor 19, is secured by a screw 27 to the outer peripheral surface of the outer ring 23. In this state, the tip of the sensor 19 faces the outer peripheral surface of the pulser ring 17 with a minute gap (for example, 0.5 to 1 mm or less) between them. Further, an O-ring 28 is installed between the inner peripheral rim of the open section of the installation hole 18 and the outer peripheral surface of the sensor 19, to effectively seal this part.

In addition, a pair of first and second sealing means 29a and 29b are provided radially between the outer peripheral surface of the opposite ends of the inner ring 26 and the corresponding inner peripheral surface of the outer ring 23. The entrance of foreign substances such as dirt, mud, water, or the like into the part wherein the sensor 19 and the balls 9 are provided is prevented by the first and second sealing means 29a and 29b.

In addition, an engaging groove 30 is formed generally in the circumferential direction on the axially inner end (left end in the drawing) of the outer peripheral surface of the outer ring 23. The axially inner end is projected axially inwards from the mounting flange 24a. An O-ring 31 which is a third sealing means is fitted into the engaging groove 30. When the outer ring 23 and the axle tube 1 are connected to each other, the outer peripheral rim of the O-ring 31 contacts the inner peripheral surface of the axle tube 1 to seal the joined sections of the outer ring 23 and the axle tube 1, so that foreign substances such as dirt, water, or the like are prevented from entering the axle tube 1 while a differential oil inside the axle tube 1 is prevented from leaking out.

Figure 7:
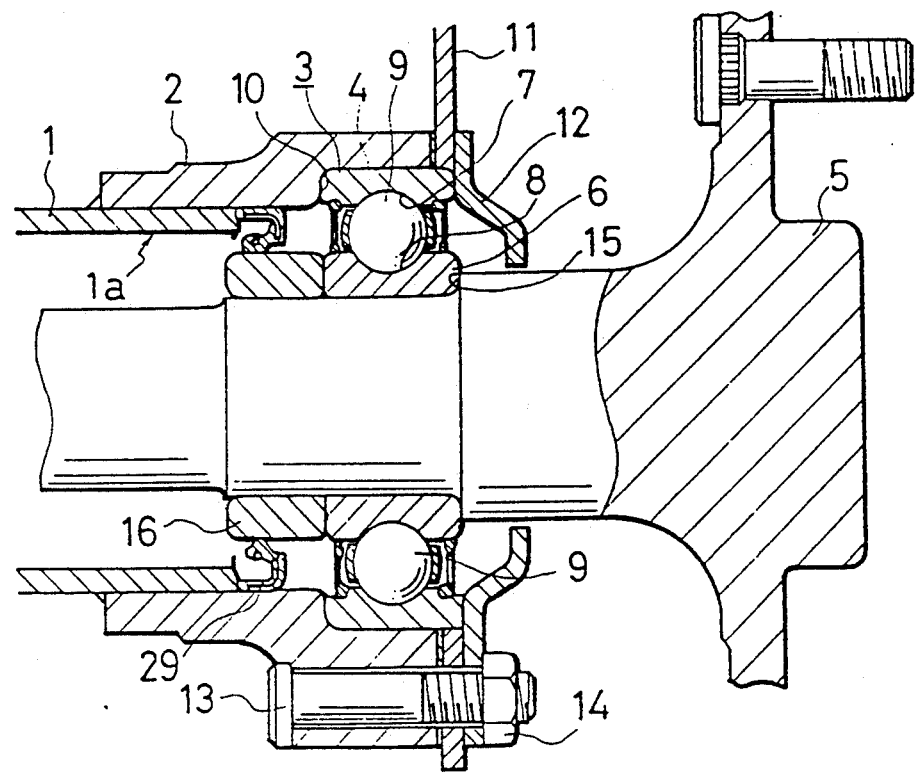
FIG. 7 is a cross sectional view to show an example of a prior art bearing assembly.
Figure 8:
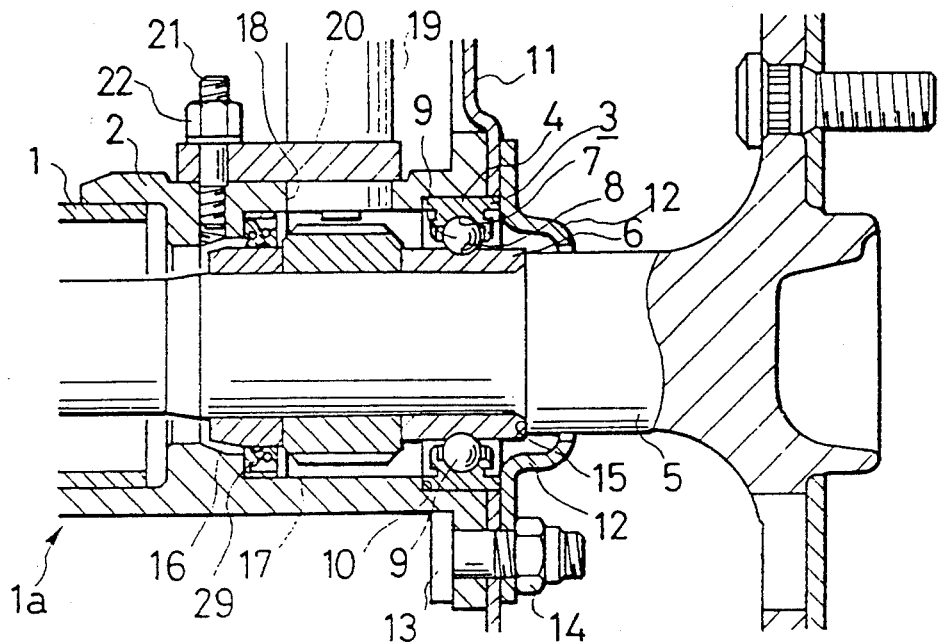
FIG. 8 is a cross sectional view to show another example of a prior art bearing assembly.

When the axle 5 (shown FIG. 7 and FIG. 8 but not in FIG. 1 and FIG. 2) is supported in a freely rotatable manner by the axle bearing unit with a rotational speed sensor of the present invention of the above-described structure, the mounting flange 24 is abutted to the receiving-side flange 25 of the axle housing or tube 1, and thus the outer ring 23 is secured to the end of the axle housing or tube 1 as the two flanges 24a and 25 are connected by a bolt 32. In addition, the end of the axle 5 is inserted into the inner ring 26.

When the inner ring 26 rotates along with the axle 5 during the operation of the vehicle, the pulser ring 17 which is secured by being fitted around the outer peripheral surface of the inner ring 26 also rotates, and the distance between the outer peripheral surface of the pulser ring 17 and the tip of the sensor 19 changes. As a result, the output e.g. magnetic flux emanating from the sensor 19 changes at a frequency proportional to the rotational speed of the axle 5.

Instead of the teeth-shaped periphery of the pulser ring 17, the pole properties of N and S may be utilized to change the output of the sensor 19 at a frequency proportional to the rotational speed of the axle 5.

Figure 2:
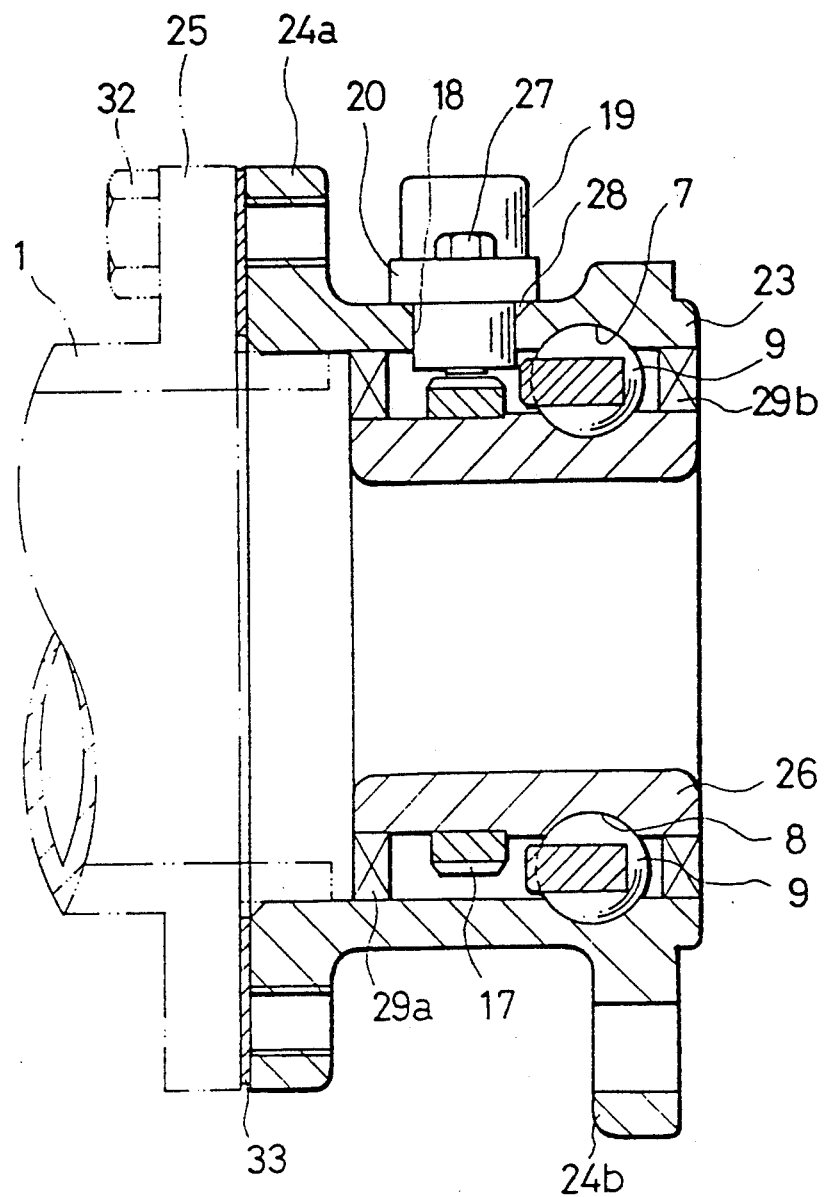
FIG. 2 is a cross sectional view to illustrate a second embodiment of the axle bearing unit according to the present invention.

FIG. 2 illustrates another embodiment of the present invention. In this embodiment, the outer ring 23 is fitted around the end of the axle tube 1, and a sheet type packing 33 (the third sealing means) is provided between the mounting flange 24a and the receiving-side flange 25 of the axle housing or tube 1 to prevent foreign substances such as dirt, water, mud or the like from entering the axle tube 1 and the differential oil inside the axle tube 1 from leaking out. In addition, the receiving-side flange 25 is positioned slightly further inside than the end of the axle housing or tube 1.

The rest of the configuration and the operation are substantially identical to that of the embodiment in FIG. 1. Therefore, further explanation is omitted. It will be noted that like reference numbers designate identical or corresponding parts throughout the drawings.

Figure 3:
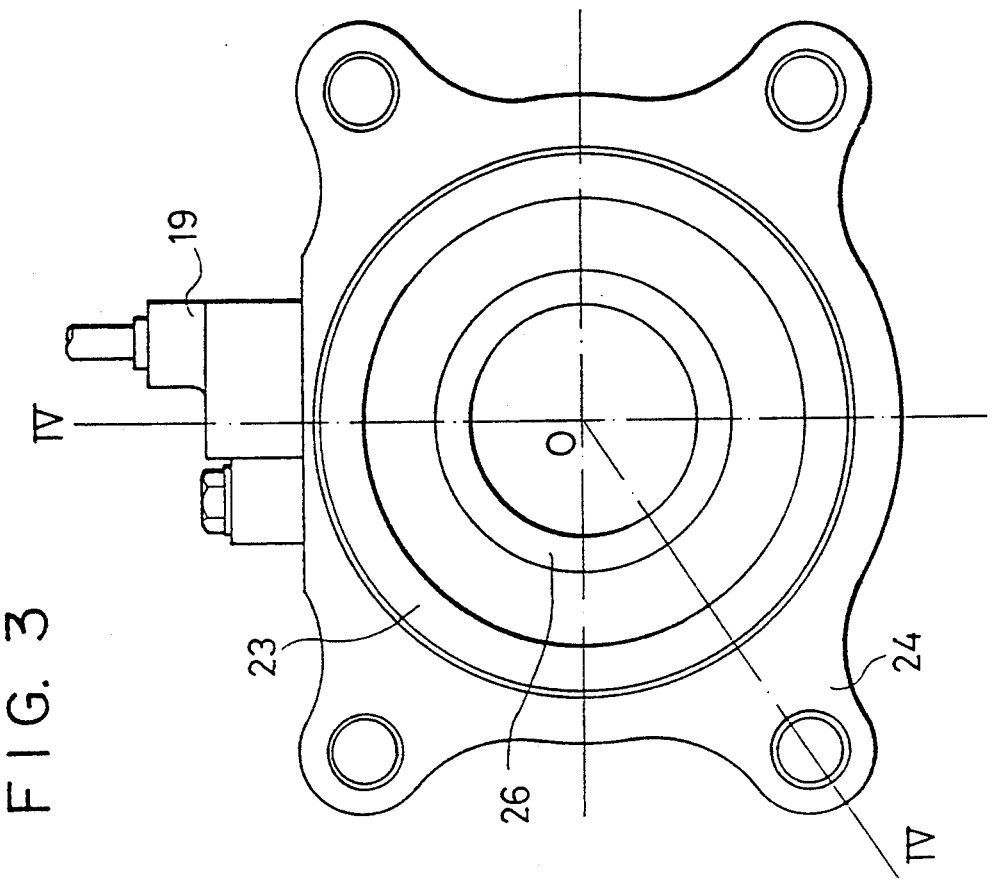
FIG. 3 is a side elevational view of a third embodiment of the axle bearing unit according to the present invention.
Figure 4:
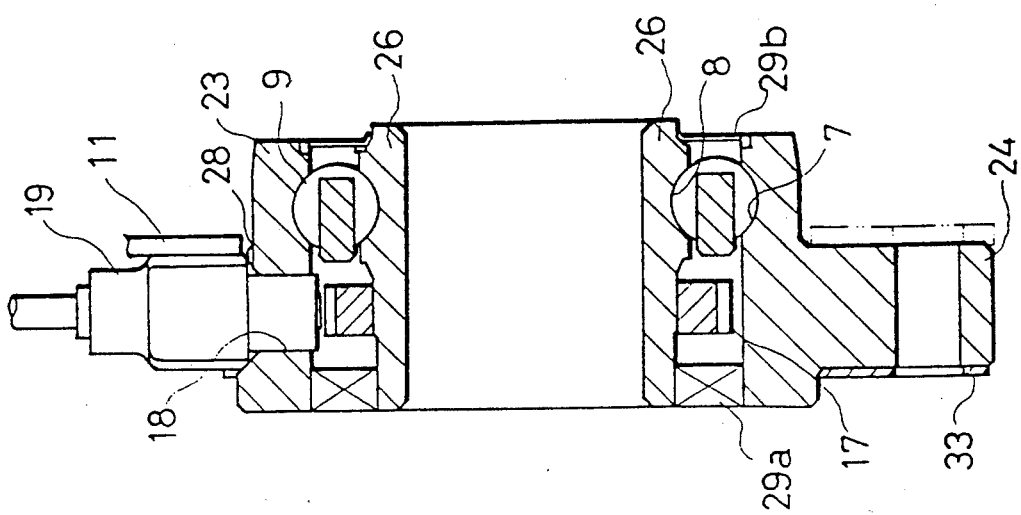
FIG. 4 is a cross sectional view taken along the line IV-O-IV in FIG. 3.

FIG. 3 and FIG. 4 illustrate another embodiment of the present invention. In this embodiment, a single mounting flange 24 is provided on the outer peripheral surface of the outer ring 23. A backing plate can be interposedly secured between the axle housing or tube (not shown) and the first side surface of the mounting flange 24 (left surface of the flange in FIG. 4) on the outer peripheral surface of the outer ring, or mounted on the second side surface (right surface of the flange in FIG. 4) opposite to the axle tube, so that the backing plate and the outer ring are together secured to the axle tube by using an outer ring securing bolt (not shown).

In this embodiment, by shifting a sensor mounting bolt in the circumferential direction with respect to the central axis of the sensor, the spacing in the axial direction of the sensor is reduced, so that the sensor does not protrude from the left or right side surface of the flange.

Figure 5:
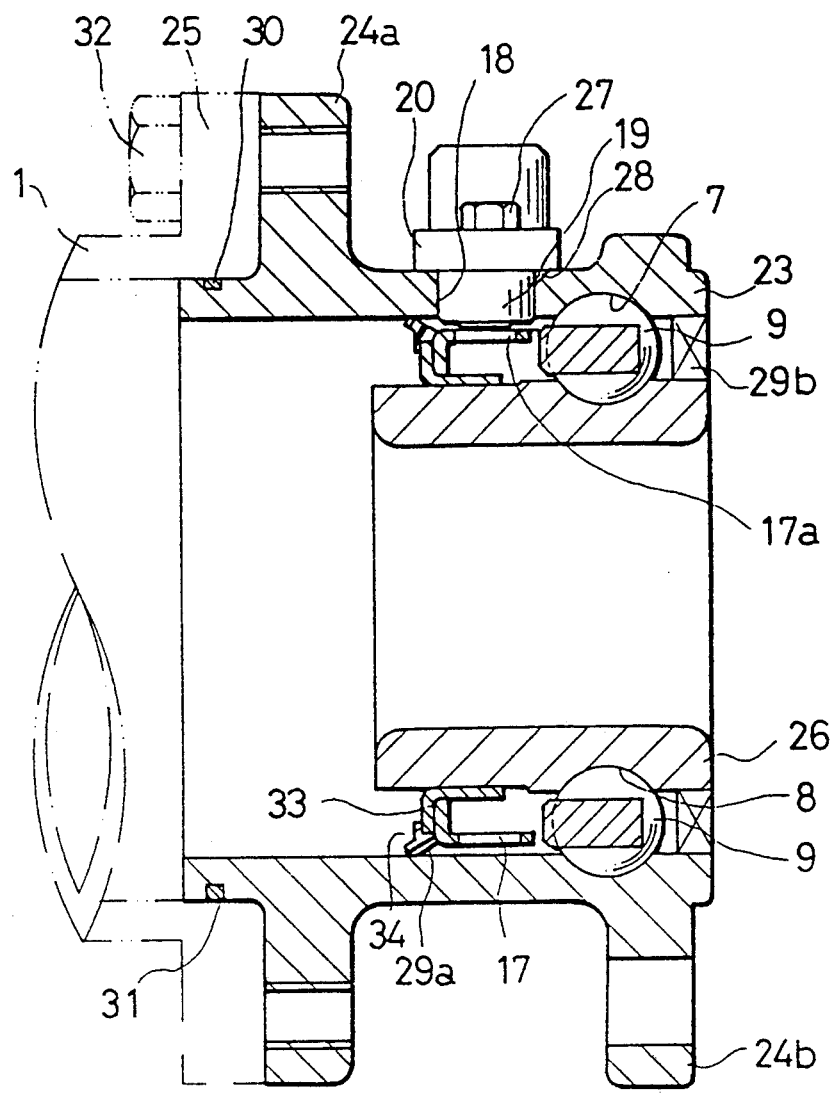
FIG. 5 is a cross sectional view of a fourth embodiment of the axle bearing unit according to the present invention.

FIG. 5 shows another embodiment of the present invention. In this embodiment, a pulser ring 17 is integrally combined with a sealing means 29a closer to the axle tube 1, so as to decrease the number of parts and simplify the assembling operation.

A core member 33 having a substantially L-shaped cross section is combined with the pulser ring 17 also having a substantially L-shaped cross section, although in a different attitude, to form a ring having a substantially channel-shaped cross section. A seal lip 34 is connected to the core member 33 to form a seal means 29a.

The seal means 29a is fitted onto the rotatable inner ring 26. The seal lip of the seal means 29a comes slidably into contact with the inner peripheral surface of the outer ring 23, so as to prevent the oil in the axle tube 1 from entering the bearing unit.

The pulser ring 17 has a plurality of holes or windows 17a on the cylindrical surface thereof, which are arranged with a uniform pitch in a circumferential direction. The holes or windows 17a are opposed to the sensor 19, so that as the inner ring 26 is rotated, the magnetic property, specifically magnetic flux is varied to detect the rotating speed.

Figure 6:
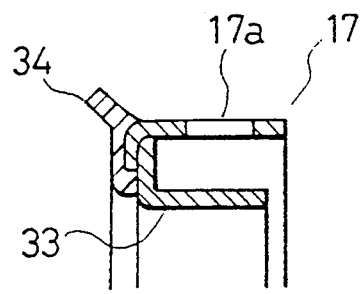
FIG. 6 is a cross sectional view of a pulser ring combined with a seal member to be used in the present invention.

FIG. 6 shows another example of the combination of the pulser ring 17 with the core member 33 and seal lip 34. The pulsar ring 17 is fitted onto the outer peripheral edge of the core member 33.

In operation, the axle bearing unit of the present invention can be easily and instantly connected to the axle housing or tube of an automobile because of the outer ring integrally formed with a mount flange.

Any slight bending of the axle causes no problem because the opposite ends of the axle are supported by a single-row bearing in the unit.

The oil in the axle housing is prevented from penetrating into the bearing due to the first sealing means of the bearing unit.

The oil in the axle housing is prevented from leaking out due to the third sealing means of the bearing unit.

The sensor installation hole enables the bearing unit to reduce the number of parts and making the bearing unit compact.

In the bearing unit with a rotational speed sensor of the present invention as constructed in the above-described structure, the number of parts is thus reduced so that costs are reduced because the management of parts and the assembly operation are simplified, and the comfort of the ride is improved and fuel costs are reduced by reducing the weight.

What is claimed is:

1. A ball bearing unit connected to an axle housing through which an axle shaft is extended to support an automobile wheel and supported at one end by the ball bearing unit and at the other end by another bearing, the axle housing containing oil therein, comprising;

an outer ring having an outer peripheral surface from which a flange is extended to be secured to the axle housing, an inner peripheral surface on which a single outer race is provided, and an installation hole provided adjacent the outer race, a sensor mounted to the outer ring through the installation hole, an inner ring having an outer peripheral surface on which a single inner race is provided, and an inner peripheral surface through which the axle shaft is extended, a pulser ring secured to the outer peripheral surface of the inner ring, a plurality of balls provided between the outer race and the inner race to form a single-row, deep groove ball bearing, a first sealing means provided closer to the axle housing with reference to the balls and pulser ring, to seal the inner and outer rings so as to prevent the oil in the axle housing from penetrating into the ball bearing, a second sealing means provided closer to the automobile wheel with reference to the balls and pulser ring to seal the outer and inner rings so as to prevent foreign substances from penetrating into the ball bearing, and the flange of the outer ring having a seal surface formed thereon to seal the flange and the axle housing to prevent the oil in the axle housing from leaking out.

2. The bearing unit of claim 1, wherein the seal surface is formed with a groove to mount a seal member thereto.

3. The bearing unit of claim 1, wherein the pulser ring has a L-shape in cross section with one leg of the L-shape to form a cylindrical surface the magnetic property of which is varied in a uniform pitch in a circumferential direction, and is integrally combined with one of the first and second sealing means.

4. The bearing unit of claim 1, wherein the pulser ring has a L-shape in cross section with one leg of the L-shape to form a cylindrical surface the magnetic flux from which is varied in a uniform pitch in a circumferential direction, and is integrally combined with one of the first and second sealing means.

* * * * *